United States Patent [19]

Tetzlaff et al.

[11] 4,297,323
[45] Oct. 27, 1981

[54] PRESSURE VESSEL HAVING QUICK-ACTION LOCKING MEANS

[75] Inventors: Karl-Heinz Tetzlaff, Kelkheim; Wilhelm Riemenschneider, Frankfurt am Main; Günter Leuschner, Schwalbach, all of Fed. Rep. of Germany

[73] Assignee: Hoechst Aktiengesellschaft, Frankfurt am Main, Fed. Rep. of Germany

[21] Appl. No.: 181,807

[22] Filed: Aug. 27, 1980

[30] Foreign Application Priority Data

Aug. 29, 1979 [DE] Fed. Rep. of Germany ....... 2934789

[51] Int. Cl.³ .............................. B01J 3/03; B01J 3/04
[52] U.S. Cl. .................................. 422/208; 422/226; 422/242
[58] Field of Search .............. 422/208, 226, 242, 310, 422/102, 104; 73/35, 167, 191, 825

[56] References Cited

U.S. PATENT DOCUMENTS

| | | | |
|---|---|---|---|
| 3,547,589 | 12/1970 | Rice et al. | 422/242 |
| 4,122,704 | 10/1978 | Lutenegger et al. | 73/825 |
| 4,192,849 | 3/1980 | Scheubeck et al. | 422/242 |

*Primary Examiner*—Bradley Garris
*Attorney, Agent, or Firm*—Curtis, Morris & Safford

[57] ABSTRACT

The invention provides a quick-action locking means for pressure vessels, consisting of a holder to which the top of the pressure vessel containing connections and/or measuring equipment is rigidly mounted, a presser, and a sliding spacer device positioned between the detachable lower part of the pressure vessel and the presser. The lower part of the pressure vessel positioned on the spacer device is pressed against the top by the presser. The locking means of the invention allows rapid opening and closing of the pressure vessel without using tools and without dismounting tubular ducts and fittings.

9 Claims, 1 Drawing Figure

U.S. Patent
Oct. 27, 1981
4,297,323
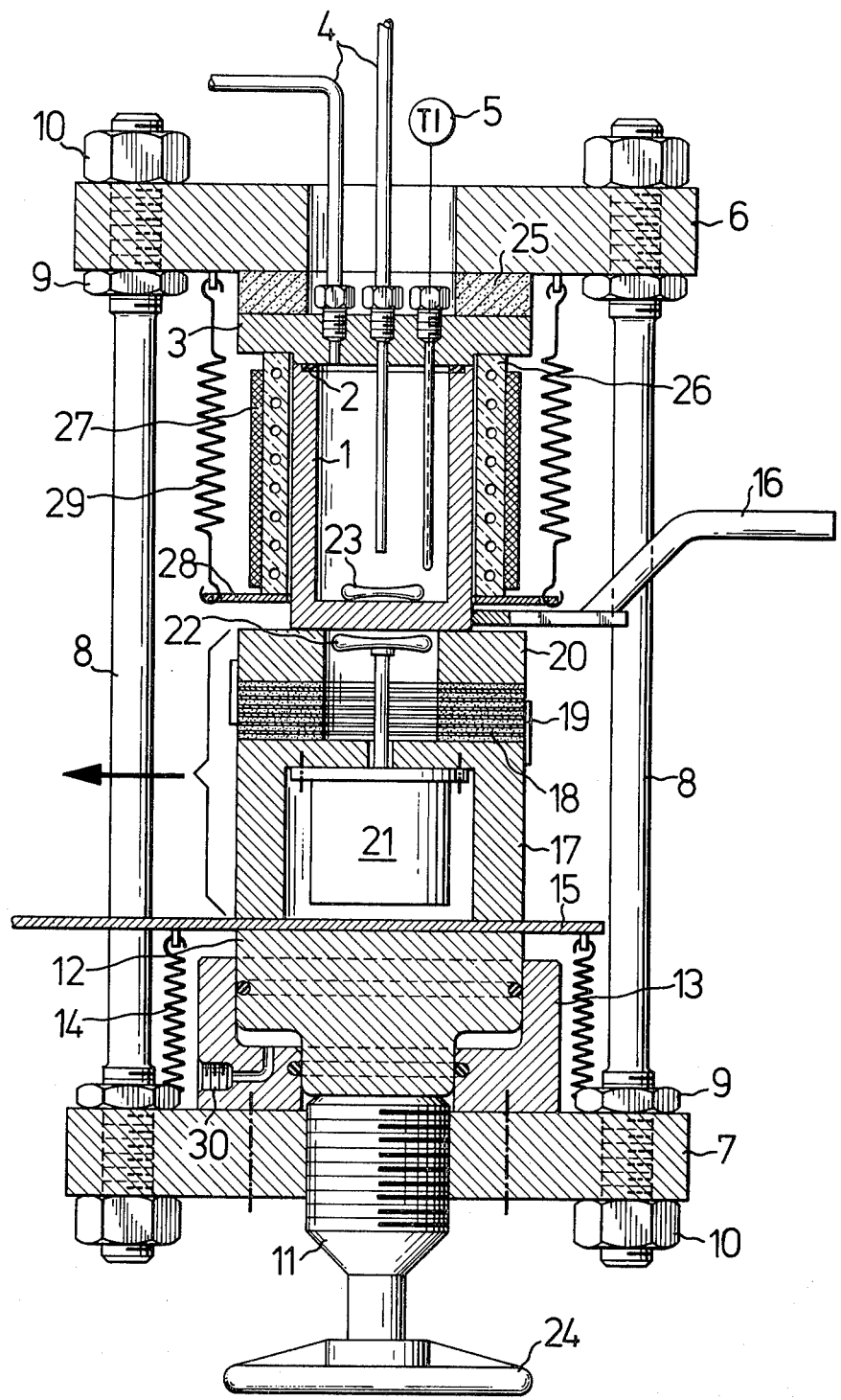

PRESSURE VESSEL HAVING QUICK-ACTION LOCKING MEANS

In order to clean and to recharge known pressure vessels for chemical reactions, the corresponding ducts must be removed and the main flange has to be opened. Especially in the case of batchwise operation, this requires large periods of time for assembly work which must be considered as lost and which are the more uneconomic the shorter the reaction times are. Moreover, this frequent mounting and dismounting results in damages and thus in increased repair work, especially with respect to the high pressure connections.

Subject of the invention is therefore a pressure vessel with a quick-action locking means which comprises a holder to which the top of the pressure vessel containing connections and/or measuring equipment is rigidly mounted, a presser, and a sliding spacer device positioned between the detachable lower part of the pressure vessel and the presser; the top of the pressure vessel and the lower part thereof positioned on the spacer device being tightly compressed by the presser. This quick-action locking means overcomes the above disadvantages of pressure vessel operations and essentially simplifies chemical reactions carried out under elevated pressure.

The holder is a solid framework in which the other pieces of the quick-action locking means, the pressure vessel, the spacer device and the presser are mounted. Preferably, it consists of two plates being connected by screws. Alternatively, the plates may be connected by further solid plates or rods, or by a metal cylinder or the like when using round plates, as far as recesses are provided on one side, preferably on both sides, which ensure removal of the lower part of the pressure vessel and possibly the spacer device. The top of the pressure vessel is rigidly mounted to one of the plates connected by screws or other suitable means (hereinafter also called upper plate for the sake of simplicity), and connecting ducts and measuring apparatus are passed through this plate and the top of the pressure vessel.

A presser is mounted in one of the two plates, preferably the plate positioned opposite to that which carries the top of the pressure vessel (hereinafter also called lower plate). In the most simple case, this presser consists of one or more pressure screws which compress top and lower part of the pressure vessel via a spacer. When an increased strain has to be endured, pressers operating according to pneumatic or hydraulic principles are applied, for example hydraulic nuts or cylinders. The presser may alternatively consist of several hydraulic nuts compressing the two plates via the corresponding screws. However, use of a presser arranged centrally in the lower plate is advantageous, because one unit only is required, and because, in the case of a pneumatic or hydraulic presser, it can be supported by one single screw to be handled without tools. The pneumatic or hydraulic pressure is then used for prestress only.

Between pressure vessel and presser there is positioned a spacer device which is detachable or sliding, thus creating the space for removing the lower part of the pressure vessel. The length of the spacer device should be chosen in such a manner that, after lowering, the lower part of the vessel can be removed without being hindered by thermometer tubes or heating jackets. Alternatively, it may be slid downward by means of, for example, a bayonet element, as far as corresponding recesses are provided in the piece supporting the spacer device. The spacer device may contain simultaneously a heater, a cooler, and a drive for a magnetic stirrer. The lower part of the pressure vessel, that is, the reactor, is pressed by the presser via the spacer device against the top of the pressure vessel rigidly mounted to the holder. Between top and lower part of the pressure vessel, a gasket is positioned for the precisely dimensioned forming of which it is advantageous to use pneumatic or hydraulic means as presser. Heating and cooling means may surround the lower part of the pressure vessel, and they are fastened to the holder by tension springs, for example.

For thermal insulation, insulating layers may be arranged above and below the pressure vessel. In the case where these layers are not sufficiently elastic from the start due to a corresponding choice of material (for example It plates) for sealing top and lower part of the pressure vessel, the pieces under tensile strain, that is, the connections of the two holder plates and/or the pieces under pressure stress, may contain resilient elements such as expansion screws and/or elastic washers.

The locking means of the invention allows very rapid opening and closing of the pressure vessel without using tools and without dismounting tubular ducts or fittings. Control equipment can be maintained solidly fixed in an indicator panel or a control board. These properties allow an especially advantageous and efficient application of the locking means of the invention for high pressure test reactors.

When using the quick-action locking means of the invention for carrying out tests under elevated pressure, technicians are not required as personnel. The number of batches run per day in the pressure vessel can be considerably increased because of the very simple and rapid insertion and removal of the reactor, that is, the lower part of the pressure vessel. Moreover, application of the spacer device in the locking means of the invention shortens the path of work of the presser, thus allowing the application of simple short-stroke equipment and small hydraulic pumps with very low delivery volume at high pressure. Use of the spacer device allows furthermore to keep low the overall height of the locking means of the invention.

The invention will be better understood by reference to the accompanying drawing which illustrates an example of an especially advantageous embodiment of the quick-action locking means.

The pressure vessel, consisting of lower part 1, top 3 and gasket 2, is connected to a rigidly mounted duct system 4 with immersion tube thermometer 5. The duct system 4 and the plate 6 are fixed to a suitable framework or support (not shown). Since the plates 6 and 7 have to absorb pressure strain on operation of the pressure vessel, they are tensioned with each other by the screws 8 and the nuts 9 and 10. The nut 9, however, serves only for ensuring a certain rigidity after removal of the lower part 1 of the pressure vessel. The plate 7 supports a presser which presses the lower part 1 against the top 3 via the spacer device consisting of several pieces. The tension forces can be produced by one or more screws 11. In the case of high pressure, however, it is advantageous to produce these forces by a hydraulic piston 12 and cylinder 13, and to use the screw 11 for relief, so that the hydraulic oil fed to the cylinder 13 via the inlet 30 need not constantly be maintained under pressure. When the pressure is to be relieved, it is advantageous to establish the oil pressure again for a short time. Thus, the screw 11 can be easily loosened with the aid of the handwheel 24. The recuperating springs 14 bring back the piston 12 to its initial position. The spacer device indicated by a bracket (pieces 17 to 22) can then be slid on a metal sheet 15 in the direction of arrow. Subsequently, the lower part 1 of the pressure vessel can be let down and removed for cleaning or charging purposes. In the case of small vessels, a handle 16 is sufficient. The spacer device consists in detail of a hollow cylinder 17 carrying a stirring motor 21 with magnetic stirrer 22, a disk 20 and a heat-insulating layer 18, which is formed by several It plates and intermediate thin sheet-metal plates. For better centering, several sheet-metal strips 19 are arranged around the plates. Heat insulation can be ensured alternatively by other solid material, as indicated in piece 25 above the top 3. Temperature control is ensured by a cooler 26 and a heater 27 supported by a disk 28 and a spring 29. The magnetic paddle 23 is the stirring means belonging to the magnetic stirrer.

What is claimed is:

1. A pressure vessel having quick-action locking means therefor which comprises a holder to which the top of the pressure vessel containing connections and/or measuring equipment is rigidly mounted, a presser, and a sliding spacer device positioned between the detachable lower part of the pressure vessel and the presser; the top of the pressure vessel and the lower part thereof positioned on the spacer device being tightly compressed by the presser.

2. The pressure vessel as claimed in claim 1, which comprises as presser one or more pressure screws.

3. The pressure vessel as claimed in claim 1, which comprises as presser one or more pneumatic or hydraulic devices.

4. The pressure vessel as claimed in claim 3, wherein the pneumatic or hydraulic pressers include one or more pressure screws for relieving pressure.

5. The pressure vessel as claimed in claim 1, wherein the presser is centrally arranged in the holder.

6. The pressure vessel as claimed in claim 1, wherein heat-insulating layers are provided below and/or above the pressure vessel.

7. The pressure vessel as claimed in claim 1, which comprises elastic elements located between the top of the pressure vessel and the presser.

8. The pressure vessel as claimed in claim 1, wherein the spacer device contains a drive for a stirrer.

9. The pressure vessel as claimed in claim 1, wherein the spacer device contains heating and/or cooling equipment.

* * * * *